US012572191B2

(12) United States Patent
Nam et al.

(10) Patent No.: US 12,572,191 B2
(45) Date of Patent: Mar. 10, 2026

(54) POWER MANAGEMENT INTEGRATED CIRCUIT, ELECTRONIC DEVICE HAVING THE SAME, AND OPERATING METHOD THEREOF

(71) Applicant: SAMSUNG ELECTRONICS CO., LTD., Suwon-si (KR)

(72) Inventors: Hyunseok Nam, Suwon-si (KR); Seongmun Park, Suwon-si (KR); Yongsung Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 18/137,665

(22) Filed: Apr. 21, 2023

(65) Prior Publication Data

US 2024/0036626 A1 Feb. 1, 2024

(30) Foreign Application Priority Data

Jul. 28, 2022 (KR) ........................ 10-2022-0093662

(51) Int. Cl.
*G06F 1/3203* (2019.01)

(52) U.S. Cl.
CPC .................................. *G06F 1/3203* (2013.01)

(58) Field of Classification Search
None
See application file for complete search history.

(56) References Cited

U.S. PATENT DOCUMENTS

| | | | |
|---|---|---|---|
| 7,679,217 B2 | 3/2010 | Dishman et al. | |
| 7,759,916 B2 | 7/2010 | Kleveland | |
| 9,336,896 B1 | 5/2016 | Hsu | |
| 10,627,839 B2 | 4/2020 | Ho et al. | |
| 2004/0263231 A1 | 12/2004 | Trafton et al. | |
| 2005/0046405 A1 | 3/2005 | Trafton et al. | |
| 2011/0022859 A1 | 1/2011 | More et al. | |
| 2014/0223217 A1* | 8/2014 | Nabhane ............... | G06F 1/3206 |
| | | | 713/340 |
| 2015/0370298 A1 | 12/2015 | Henzler et al. | |
| 2019/0302819 A1* | 10/2019 | Hu ........................... | G05F 1/575 |
| 2021/0320590 A1 | 10/2021 | Ng et al. | |
| 2021/0333812 A1* | 10/2021 | Liu ......................... | G05F 1/462 |
| 2021/0365098 A1 | 11/2021 | Hureau et al. | |
| 2022/0190705 A1 | 6/2022 | Miller et al. | |

FOREIGN PATENT DOCUMENTS

KR 10-2013-0035490 A 4/2013

OTHER PUBLICATIONS

Communication issued on Jan. 26, 2024 by the European Patent Office for European Patent Application No. 23179763.0.

* cited by examiner

*Primary Examiner* — Kim Huynh

(74) *Attorney, Agent, or Firm* — Sughrue Mion, PLLC

(57) ABSTRACT

An operating method of a power management integrated circuit includes outputting a first enable signal of a first regulator at a high level, determining whether a detection signal of a second regulator has a high level when a second enable signal of the second regulator has a low level, changing set values of the first regulator and the second regulator for a parallel mode when the detection signal has a high level, setting the first regulator and the second regulator to the changed set values, and outputting the second enable signal at a high level.

20 Claims, 16 Drawing Sheets

200

220                                                210

200a 220a                                               210a

| Comparative Example | Example Embodiment |
|---|---|
| S2VPS01A03-9230-62LGGB | S2VPS01A03-9230-62LGGB |
| S2VPS01A03-9630-6DLGGB | |
| S2VPS01A03-9233-62LGGB | |
| S2VPS01A03-9330-63LGGB | S2VPS01A03-9330-63LGGB |
| S2VPS01A03-9730-6ELGGB | |
| S2VPS01A03-9333-63LGGB | |

Detect outputs of regulators — S210

Reconfigure output lines of regulators according to detected result — S220

Output power — S230

POWER MANAGEMENT INTEGRATED CIRCUIT, ELECTRONIC DEVICE HAVING THE SAME, AND OPERATING METHOD THEREOF

CROSS-REFERENCE TO RELATED APPLICATION(S)

This application is based on and claims benefit of priority from Korean Patent Application No. 10-2022-0093662 filed on Jul. 28, 2022 in the Korean Intellectual Property Office, the disclosure of which is incorporated herein by reference in its entirety.

BACKGROUND

1. Field

The disclosure relates to a power management integrated circuit (PMIC), an electronic device having the PMIC, and an operating method of the PMIC.

2. Description of Related Art

Recently, demand has increased for efficient power management of mobile devices, such as smartphones and tablet PCs. In particular, there is demand for a PMIC that may minimize power consumption of mobile devices and increase efficiency in operation and use of resources.

SUMMARY

According to an aspect of the disclosure, there is provided a power management integrated circuit with shortened product development time, an electronic device having the same, and an operating method thereof.

According to an aspect of the disclosure, there is provided a power management integrated circuit including: a first regulator configured to operate based on a first set value and output a first output voltage; a second regulator configured to operate based on a second set value and output a second output voltage; a third regulator configured to operate based on a third set value and output a third output voltage; a first voltage detector configured to monitor the first output voltage and output a first detection signal; a second voltage detector configured to monitor the second output voltage and output a second detection signal; a third voltage detector configured to monitor the third output voltage and output a third detection signal; and a controller configured to determine the first set value, the second set value, and the third set value based on the first detection signal, the second detection signal, or the third detection signal.

According to another aspect of the disclosure, there is provided an operating method of a power management integrated circuit, the operating method including: outputting a first enable signal of a first regulator at a high level; determining whether a detection signal of a second regulator has a high level when a second enable signal of the second regulator has a low level; changing set values of the first regulator and the second regulator for a parallel mode based on the detection signal of the second regulator having the high level; setting the first regulator and the second regulator to the changed set values; and outputting the second enable signal at a high level.

According to another aspect of the disclosure, there is provided an electronic device including: a processor; and a power management integrated circuit configured to supply power to the processor, wherein the power management integrated circuit includes: a plurality of regulators; and a controller configured to: monitor output voltages of the plurality of regulators, and change a set value for determining an operating mode of each of the plurality of regulators to be either a stand-alone mode or a parallel mode based on the output voltages of the plurality of regulators.

According to another aspect of the disclosure, there is provided a power management integrated circuit including: a plurality of regulators; and a plurality of selection logics configured to select set values corresponding to an operating mode of each of the plurality of regulators, wherein each of the plurality of selection logics includes: a first non-volatile memory configured to store default information corresponding to a stand-alone mode; a second non-volatile memory configured to store update information corresponding to a parallel mode; a first register configured to store the default information read from the first non-volatile memory; a second register configured to store the update information read from the second non-volatile memory; and a multiplexer configured to select one of a first output value of the first register and a second output value of the second register as a set value of a corresponding regulator, among the plurality of regulators, based on a selection signal.

According to another aspect of the disclosure, there is provided an operating method of a power management integrated circuit, the method including: detecting output voltages of a plurality of regulators; reorganizing output lines of the plurality of regulators based on the output voltages of a plurality of regulators; and outputting power through the reorganized output lines, wherein the reorganizing of the output lines includes: changing set values of the plurality of regulators based on the output voltages of a plurality of regulators.

BRIEF DESCRIPTION OF DRAWINGS

The above and other aspects, features, and advantages of the disclosure will be more clearly understood from the following detailed description, taken in conjunction with the accompanying drawings, in which.

DETAILED DESCRIPTION

Hereinafter, example embodiments of the disclosure will be described with reference to the accompanying drawings.

According to an example embodiment of the disclosure, a power management integrated circuit (PMIC), an electronic device having the PMIC, and an operating method of the PMIC may automatically supply current capacity by connecting an output of a power regulator without changing a product. The PMIC according to an example embodiment of the disclosure may include a power converter, an output voltage detector, a digital logic circuit, and a connection configuration circuit capable of performing a parallel operation. According to the embodiment of the disclosure, the PMIC may increase current capacity by configuring the power converters in parallel without changing a product. As a result, the PMIC according the embodiment of the disclosure may secure flexibility of using power and shorten a product development schedule.

In a PMIC employing a comparative power reconfiguration method, an internal connection is performed in advance so that power converters may be reorganized with each other, and then an internal connection relationship is controlled through a one-time programming (OTP) value in an OTP memory. Therefore, since reconfiguration is performed by changing the OTP value, it is necessary to additionally verify the PMIC and manage a product. Due to the change of the physical OTP value, there is a burden of performing PMIC verification again and managing additionally derived PMIC products. In a situation in which systems to which the PMIC are applied are diverse and the capacity of a maximum output current of the power converter changes, management and verification of derivative products may weaken the developmental competitiveness of PMICs.

Figure 1:
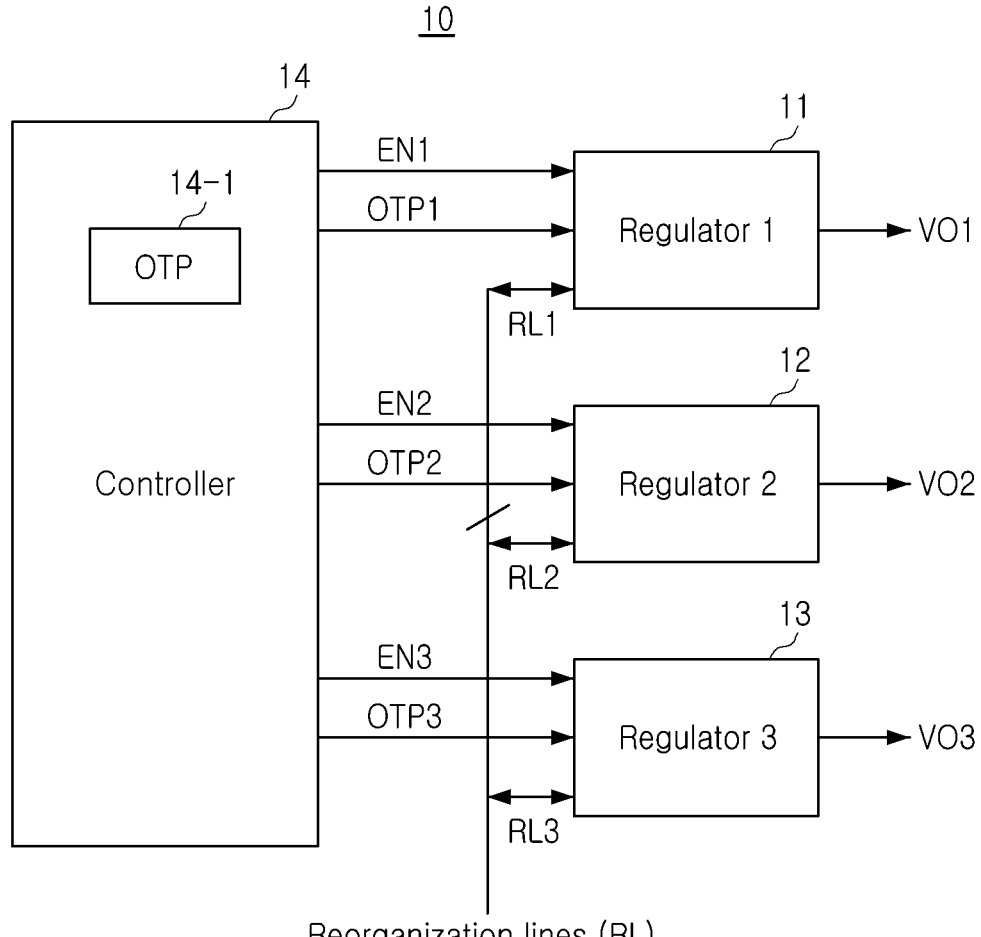
FIG. 1 is a diagram illustrating a comparative power management integrated circuit (PMIC)

FIG. 1 is a diagram illustrating a comparative PMIC 10. Referring to FIG. 1, the PMIC 10 includes a first regulator 11, a second regulator 12, a third regulator 13 and a controller (also referred as a state machine) 14.

The first regulator 11 is configured to receive a first set value OTP1 and a first enable signal EN1 from the controller 14, and output a first voltage VO1. The second regulator 12 is configured to receive a second set value OTP2 and a second enable signal EN2 from the controller 14, and output a second voltage VO2. The third regulator 13 is configured to receive a third set value OTP3 and a third enable signal EN3 from the controller 14, and output a third voltage VO3. As illustrated in FIG. 1, the first regulator 11, the second regulator 12, and the third regulator 13 receive the enable signals EN1/EN2/EN3 for controlling an ON/OFF state and receive set values OTP1/OTP2/OTP3 for selectively using an internal function, respectively.

The controller 14 is configured to control the first regulator 11, the second regulator 12, and the third regulator 13. The controller 14 includes OTP memory 14-1. The OTP memory 14-1 stores set values, including the first set value OTP1, the second set value OTP2, and the third set value OTP3.

In addition, as illustrated in FIG. 1, the plurality of regulators 11, 12, and 13 receive reorganization line values RL1, RL2, and RL3 for selecting a reorganization line RL from the controller 14 or a digital logic for parallel configuration. In general, the reorganization line values RL1, RL2, and RL3 are OTP values. Here, RL is a line that physically connects information necessary for parallel configuration of the regulators 11, 12, and 13 inside the chip. A load current detection signal and a clock signals are mainly transmitted through the RL.

Figure 2A:
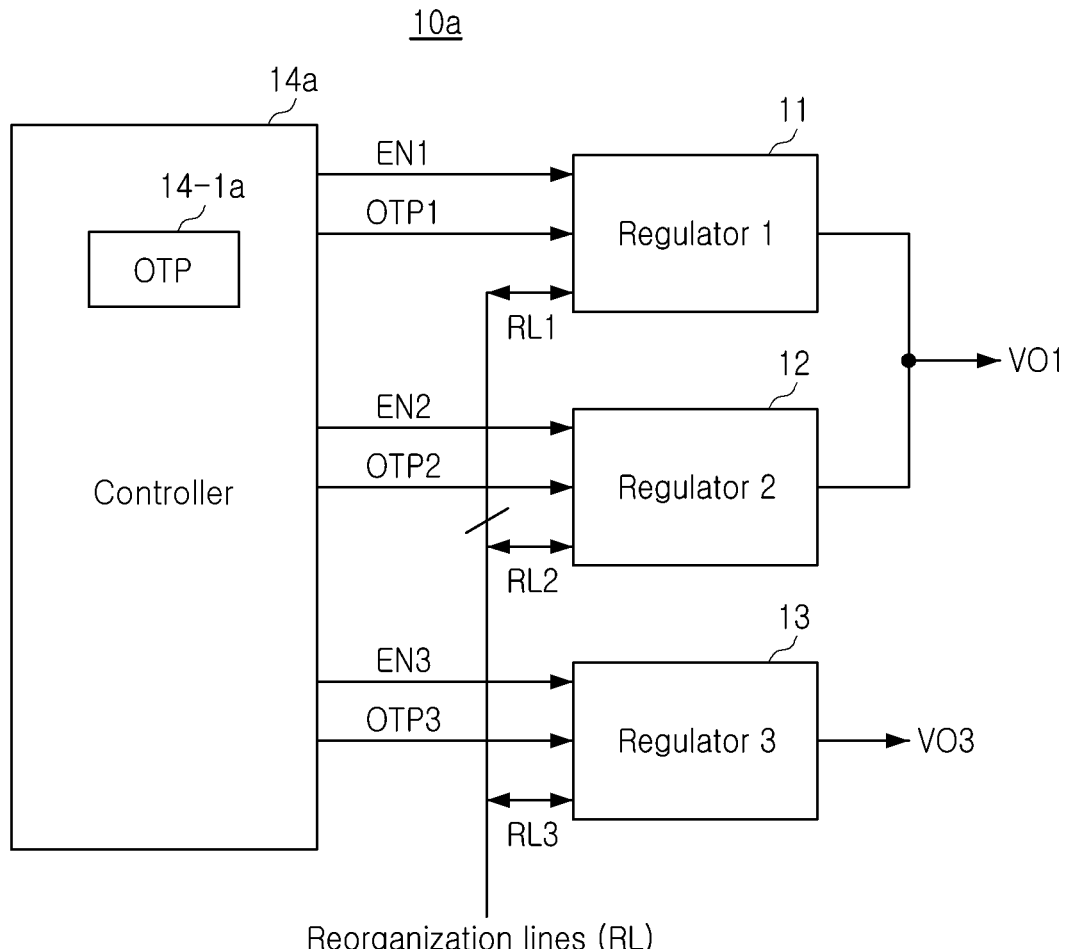
FIG. 2A is a diagram illustrating a PMIC in which two regulators are reorganized to be parallel in the PMIC of FIG. 1.

FIG. 2A is a diagram illustrating a PMIC 10*a* in which two regulators are reorganized in parallel in the PMIC 10 of FIG. 1. Referring to FIG. 2A, the PMIC 10*a* includes an OTP memory 14-1*a*, a first regulator 11, a second regulator 12 and a third regulator 13. Here, the first regulator and the second regulator 12 are connected in parallel.

The controller 14*a* transmits respective set values OTP1, OTP2, and OTP3 before each of the regulators 11, 12, and 13 is enabled for this parallel configuration. After the set values OTP1, OTP2, and OTP3 are transmitted to the regulators 11, 12, and 13, the controller 14*a* sequentially or simultaneously inputs the enable signals EN1 and EN2 to the regulators 11 and 12. Through this operation, the first regulator 11 and the second regulator 12 are connected in parallel. Accordingly, the PMIC 10*a* may supply a large current to the load system through a parallel connection configuration.

Figure 2B:
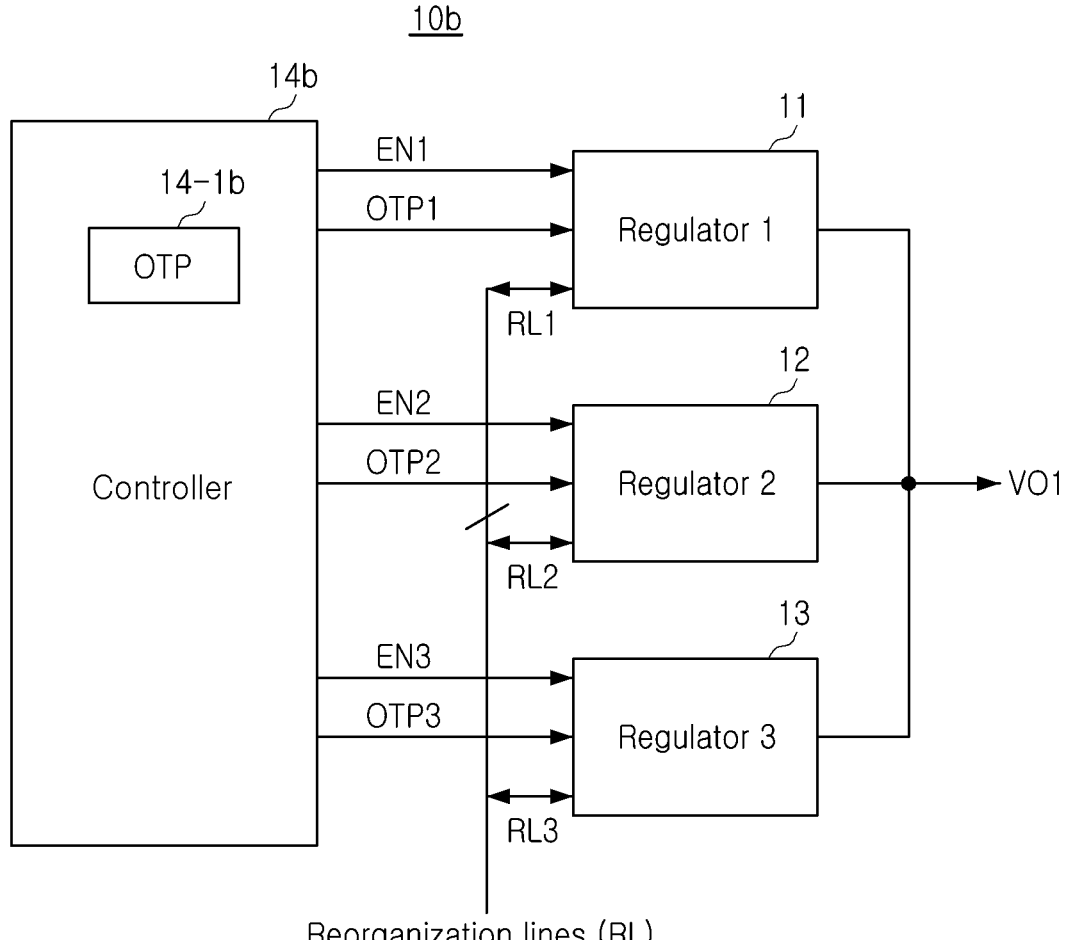
FIG. 2B is a view illustrating a PMIC in which three regulators are reorganized to be parallel in the PMIC 10 of FIG. 1.

FIG. 2B is a diagram illustrating a PMIC 10*b* in which three regulators are reorganized in parallel in the PMIC 10 of FIG. 1. Referring to FIG. 2B, the PMIC 10*b* includes an OTP memory 14-1*b*, a first regulator 11, a second regulator 12 and a third regulator 13. Here, the first regulator 11, the second regulator 12 and the third regulator 13 are configured in parallel.

Figure 3A:
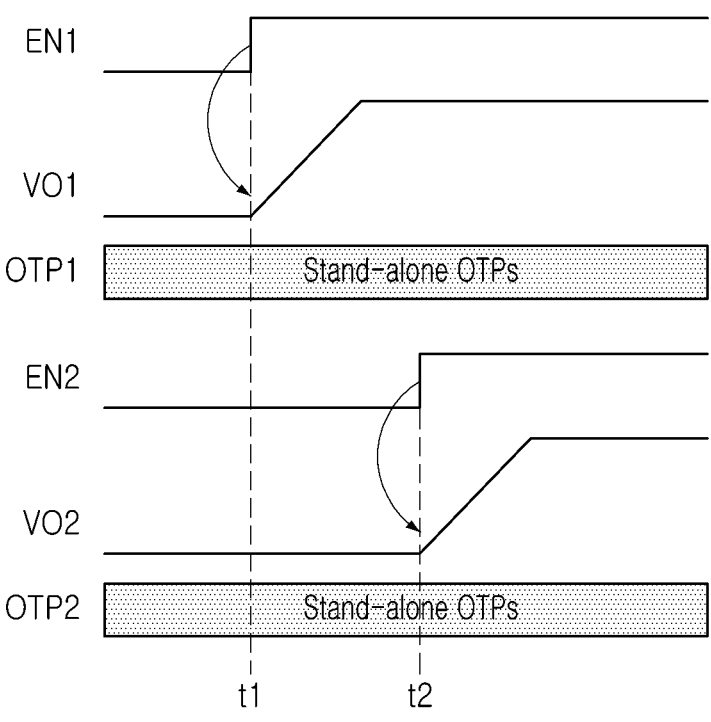
FIG. 3A is a diagram illustrating an operation timing of a PMIC operating in a stand-alone mode.
Figure 3B:
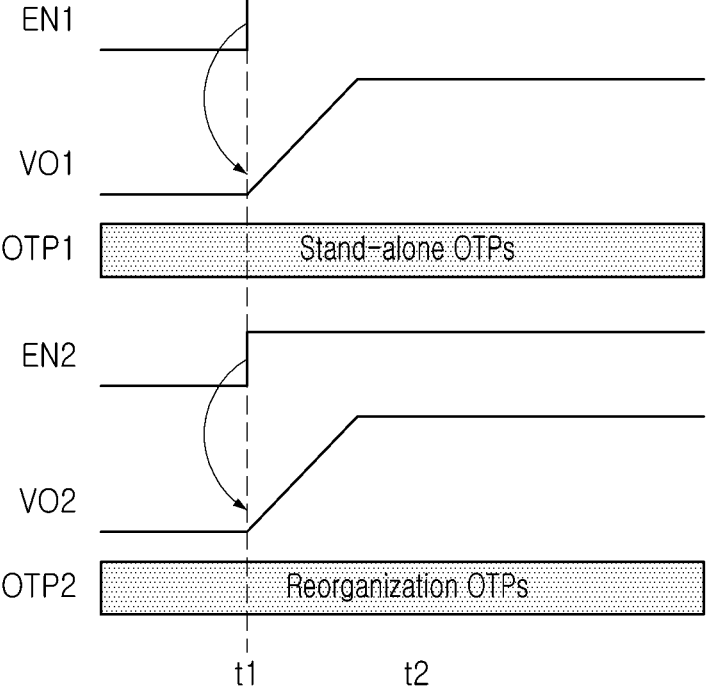
FIG. 3B is a diagram illustrating an operation timing of a PMIC operating in a parallel mode.

FIG. 3A is a diagram illustrating an operation timing of a PMIC operating in a stand-alone mode, and FIG. 3B is a diagram illustrating an operation timing of a PMIC operating in a parallel mode.

Referring to FIG. 3A, timings t1 and t2 for set values OTP1 and OTP2 and enable signals EN1 and EN2 of the first regulator 11 and the second regulator 12 in the stand-alone mode are illustrated. Each of the first regulator 11 and the second regulator 12 operates with the set values OTP1 and OTP2 and the enable signals EN1 and EN2 determined by an ON-sequence.

Referring to FIG. 3B, timings of the regulator-related signals EN1 and EN2 in the parallel mode is illustrated. For example, the enable signals EN1 and EN2 are enabled at timing t1 such that the first regulator 11 and the second regulator 12 operate in a parallel structure. Reorganization line values (e.g., reorganization OTPs) for selecting RL (reorganization line) wiring required for parallel configuration of the second regulator 12 are applied as the second regulator 12 is secondary to the first regulator 11. This OTP value is received from the digital logic or the controller 14*a* before the second regulator 12 is enabled by the enable signal EN2.

A PMIC may be selectively used by merging power converters of different topologies into one structure. According to an example embodiment of the disclosure, when power converters of the same topology are configured in parallel, such a configuration may be automatically detected and driven in parallel combination.

According to an example embodiment of the disclosure, a power supply line of a PMIC in which a plurality of power converters are embedded may be flexibly operated. For example, the PMIC, according to an example embodiment of the disclosure may respond to changes in power supply lines and capacity changes of power converters that may occur during the development process of systems, including application processor (AP) or communication processor (CP) systems, without additional measures. Accordingly, the PMIC according to an example embodiment of the disclosure may reduce product development risk and development period.

According to an example embodiment of the disclosure, the PMIC may be configured to include a wiring structure in which a power convert may be reorganized, a detecting unit detecting an output from the power converter, and a logic unit configured to determine whether to reorganize by checking a result generated by the detecting unit and an ON/OFF state of the power converter. A product to which the PMIC according to the embodiment of the disclosure is applied may respond as a single product without physical changes, such as a one-time programmable (OTP) memory even when the required capacity increases due to a change in the power wiring of the system. Accordingly, the PMIC according to an example embodiment of the disclosure may simplify product management. Therefore, the PMIC according to an example embodiment of the disclosure may shorten the development period to increase unit price of the product and also may facilitate the management of the product.

Figure 4:
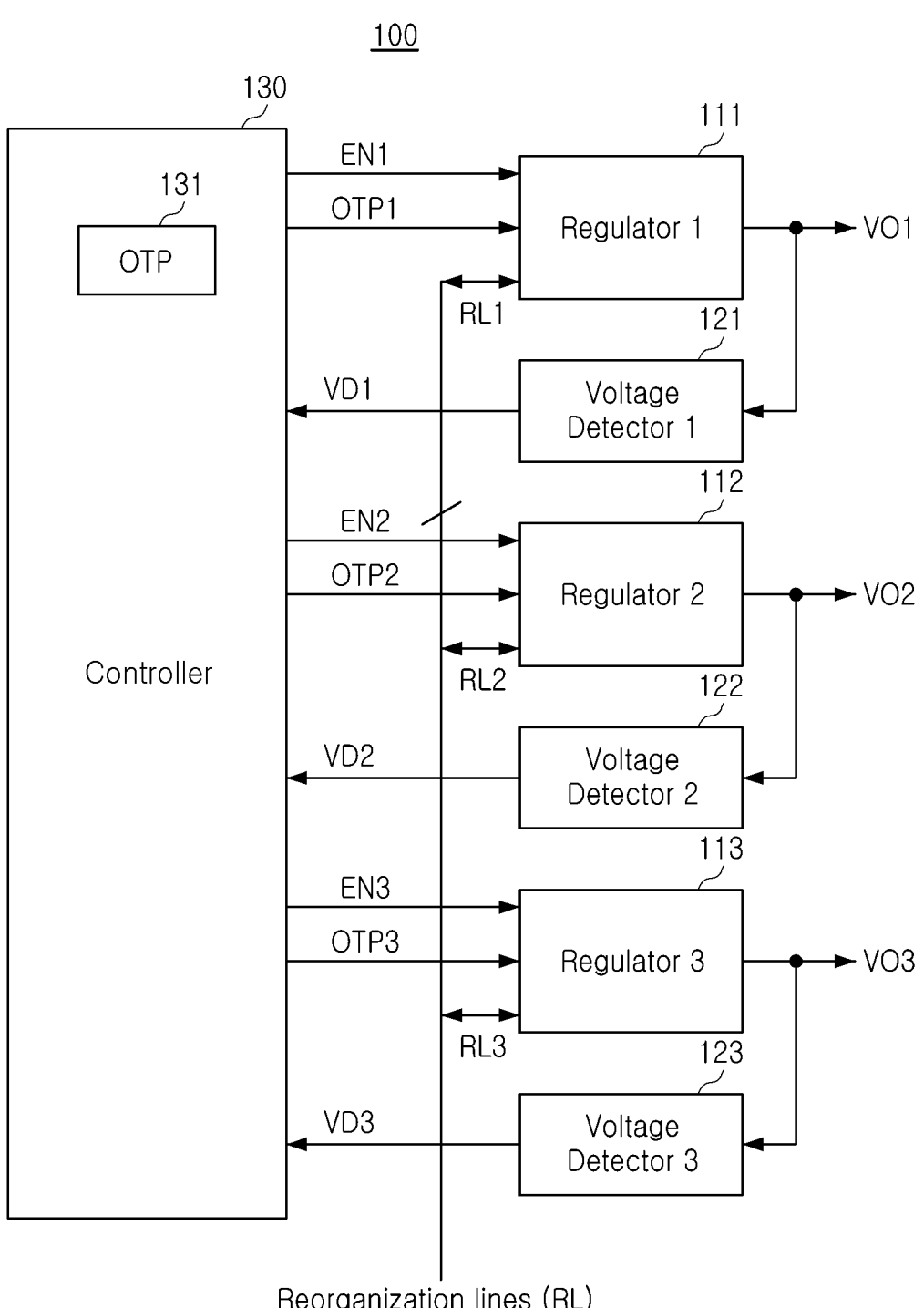
FIG. 4 is a diagram illustrating a PMIC according to an example embodiment of the disclosure.

FIG. 4 is a diagram illustrating a PMIC 100 according to an example embodiment of the disclosure. Referring to FIG. 4, the PMIC 100 may include a plurality of regulators 111, 112, and 113, a plurality of voltage detectors 121, 122, and 123, and a controller 130. For example, the plurality of regulators may include a first regulator 111, a second regulator 112, and a third regulator 113, and the plurality of voltage detectors may include a first voltage detector 121, a second voltage detector 122, and a third voltage detector 123. However, the disclosure is not limited thereto, and as such, according to another example embodiment, different number of regulators and voltage detectors may be provided.

Each of the first regulator 111, the second regulator 112, and the third regulator 113 may be implemented as one of a booster, a buck converter, and a low drop out (LDO) regulator. FIG. 4 only illustrates three regulators for convenience of description, but the number of regulators of the disclosure is not limited thereto.

Each of the first regulator 111, the second regulator 112, and the third regulator 113 may be configured to output corresponding voltages VO1, VO2, and VO3, respectively. The first regulator 111, the second regulator 112, and the third regulator 113 may operate in a stand-alone mode or a parallel mode according to the set values OTP1, OTP2, and OTP3. Here, the stand-alone mode refers to that outputs of the regulators are independently transmitted to an external device, and the parallel mode refers to that an output of one regulator is connected to an output of at least one neighboring regulator. Here, the set values OTP1, OTP2, and OTP3 may be transmitted from the controller 130.

According to an example embodiment, the first regulator 111, the second regulator 112, and the third regulator 113 may be configured to start an operation based on the enable signals EN1, EN2, and EN3. For example, the first regulator 111, the second regulator 112, and the third regulator 113 may be configured to start an operation in response to the enable signals EN1, EN2, and EN3. In an example embodiment, each of the first regulator 111, the second regulator 112, and the third regulator 113 may include specific registers for controlling an output voltage, an operating mode, and an enabled/disabled state during an execution state.

The plurality of voltage detectors 121, 122, and 123 may be configured to monitor outputs from the corresponding regulators and output detection signals VD1, VD2, and VD3 according to monitoring results, respectively. For example, the first voltage detector 121 may monitor output from the first regulator 111, and output detection signal VD1, the second voltage detector 122 may monitor output from the second regulator 112, and output detection signal VD2, and the third voltage detector 123 may monitor output from the third regulator 113, and output detection signal VD3. In an example embodiment, each of the plurality of voltage detectors 121, 122, and 123 may be implemented as part of internal components of corresponding regulators 111, 112, and 113. For example, the first voltage detector 121 may be implemented as part of internal components of the first regulator 111, the second voltage detector 122 may be implemented as part of internal components of the second regulator 112, and/or the third voltage detector 123 may be implemented as part of internal components of the third regulator 113.

The controller 130 may be configured to control the overall operation of the PMIC 100. The controller 130 may output the set values OTP1, OTP2, and OTP3 to the regulators 111, 112, and 113. Here, each of the set values OTP1, OTP2, and OTP3 may include default information and additional information indicating an operating mode. The default information may basically include information indicating a stand-alone mode. The additional information may include information indicating a parallel mode. Here, the additional information may be determined according to the detection signals VD1, VD2, and VD3 from the voltage detectors 121, 122, and 123. According to an example embodiment, the controller 130 may include one or more processors, such as, Central Processing Unit (also referred as "CPU") or a state machine. According to an example embodiment, the controller may include, but is not limited to, an Application Specific Integrated Circuit (ASIC), an electronic circuit, a Field-Programmable Gate Arrays (FPGA), Programmable System-on-Chip (PSoC), a combinational logic circuit, and/or other suitable components that provide described functionality. According to another example embodiment, one or more of the components (such as "units" or "modules") of the PMIC may be implemented by hardware, software or a combination of hardware and software.

Further, the controller 130 may receive detection signals VD1, VD2, and VD3 from the voltage detectors 121, 122, and 123.

Also, the controller 130 may include an OTP 131 storing the set values OTP1, OTP2, and OTP3.

The PMIC 100 according to an example embodiment of the disclosure may include the voltage detectors 121, 122, and 123 detecting the states of the respective output voltages VO1, VO2, and VO3 from the regulators 111, 112, and 113 to monitor the state of the corresponding output voltages VO1, VO2, and VO3. The monitored detection information (e.g., VD1, VD2, and VD3) may be transmitted to the controller 130. The controller 130 may check the present state information of the regulators through such detection information and determine each set value. Accordingly, when the regulators are configured in parallel, preset values may be automatically transmitted to the respective regulators 111, 112, and 113 according to the output voltage state. Accordingly, the PMIC 100 of the disclosure does not require additional product creation and management according to an OTP change. The PMIC 100 of the disclosure may flexibly operate the combination of the regulators 111, 112, and 113 even at the system level. Therefore, the PMIC 100 according to an example embodiment of disclosure may be easily developed as a product.

Figure 5:
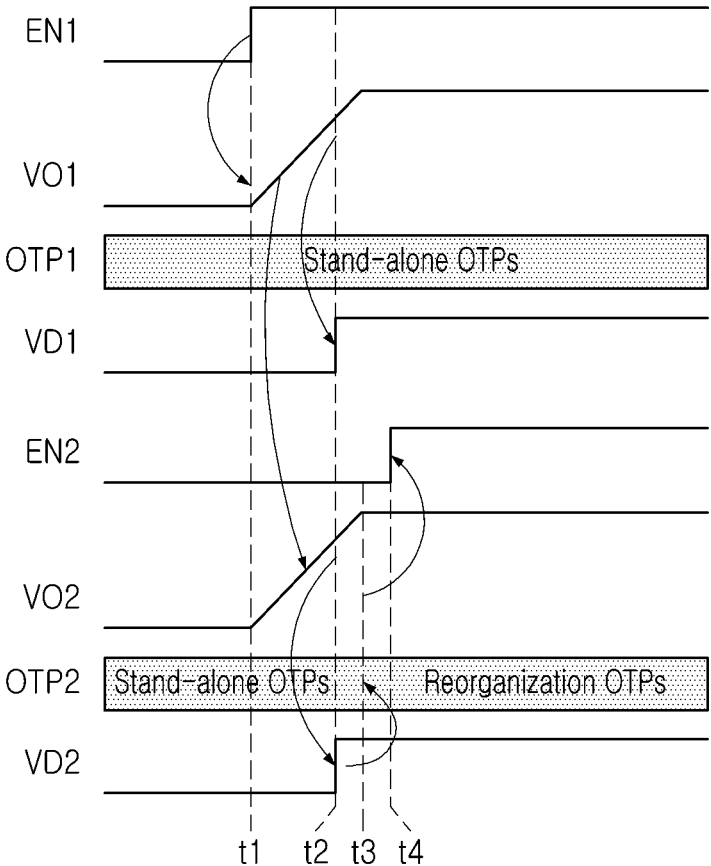
FIG. 5 is a diagram illustrating an operation timing of the PMIC illustrated in FIG. 4.

FIG. 5 is a diagram illustrating an operation timing of the PMIC 100 illustrated in FIG. 4. Referring to FIG. 5, operation waveforms for the PMIC 100 are illustrated. In FIG. it is assumed that a first regulator 111 and a second regulator 112 are connected in parallel for convenience of description.

As the first enable signal EN1 has a high level at time t1, the first regulator 111 may be enabled first. Accordingly, the first output voltage VO1 may increase. The set value OTP1 of the first regulator 111 may be an independently configured stand-alone OTP value.

Because of the parallel structure, the second output voltage VO2 of the second regulator 112 is the same as the first output voltage VO1 of the first regulator 111. At time t2, the output voltage VD2 may have a high level. After a predetermined time t3, the set value OTP2 of the second regulator 112 may be changed from the stand-alone OTP value to a reorganization OTP value. Based on the information that the changed OTP value has been stably transmitted, the second enable signal EN2 may have a high level at time t4. Accordingly, the second regulator 112 may be normally enabled. Thereafter, the second regulator 112 may operate as a voltage/current correction controller based on the reorganization OTP value.

Figure 6:
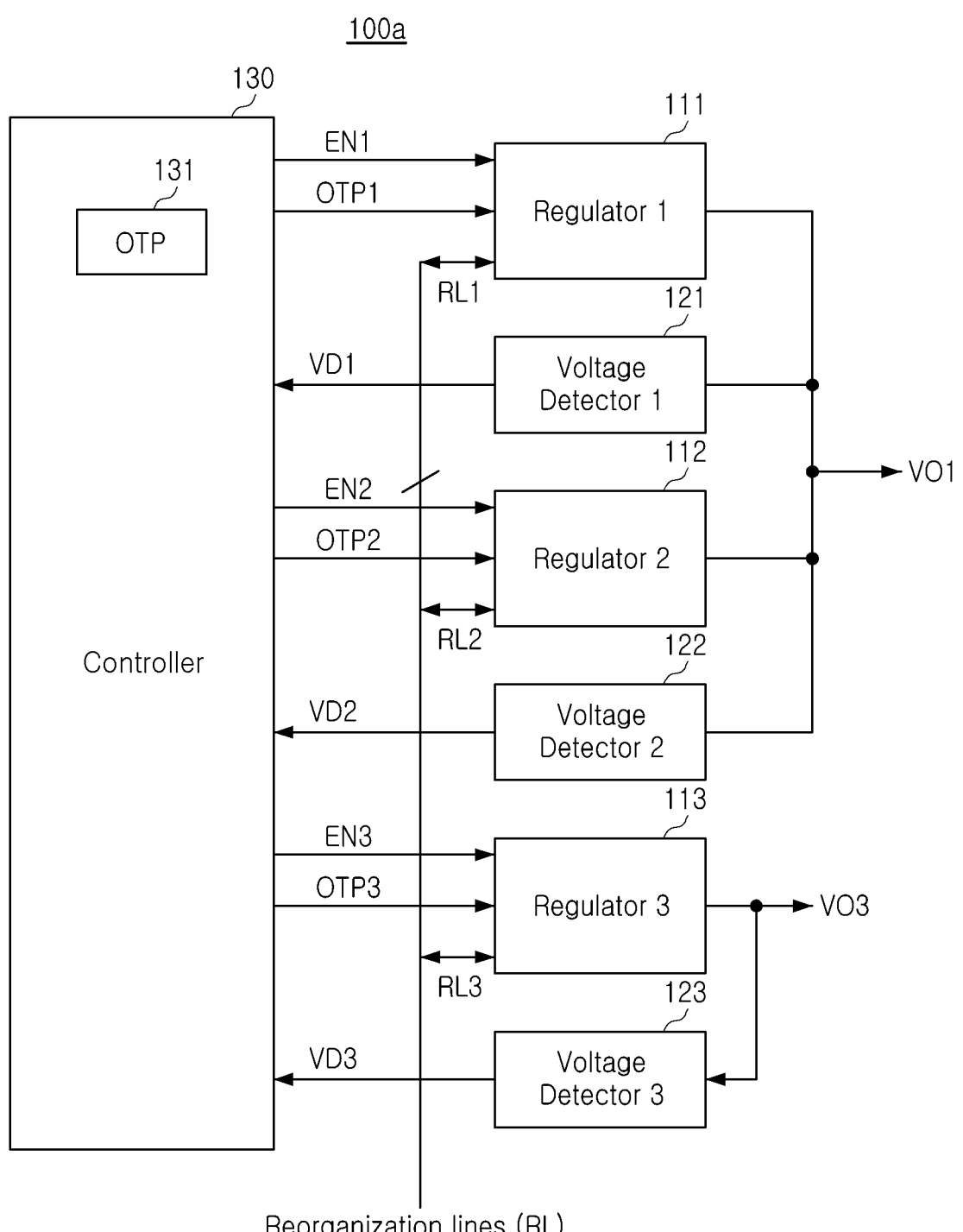
FIG. 6 is a diagram illustrating a PMIC in which two regulators are connected in parallel according to an example embodiment of the disclosure.

FIG. 6 is a diagram illustrating a PMIC 100a in which two regulators are connected in parallel according to an example embodiment of the disclosure. Referring to FIG. 6, the PMIC 100a may include the first regulator 111 and the second regulator 112 configured in parallel. The first output voltage VO1 may be output from the first and second regulators 111 and 112 connected in parallel. The third output voltage VO3 may be output from a third regulator 113.

Figure 7:
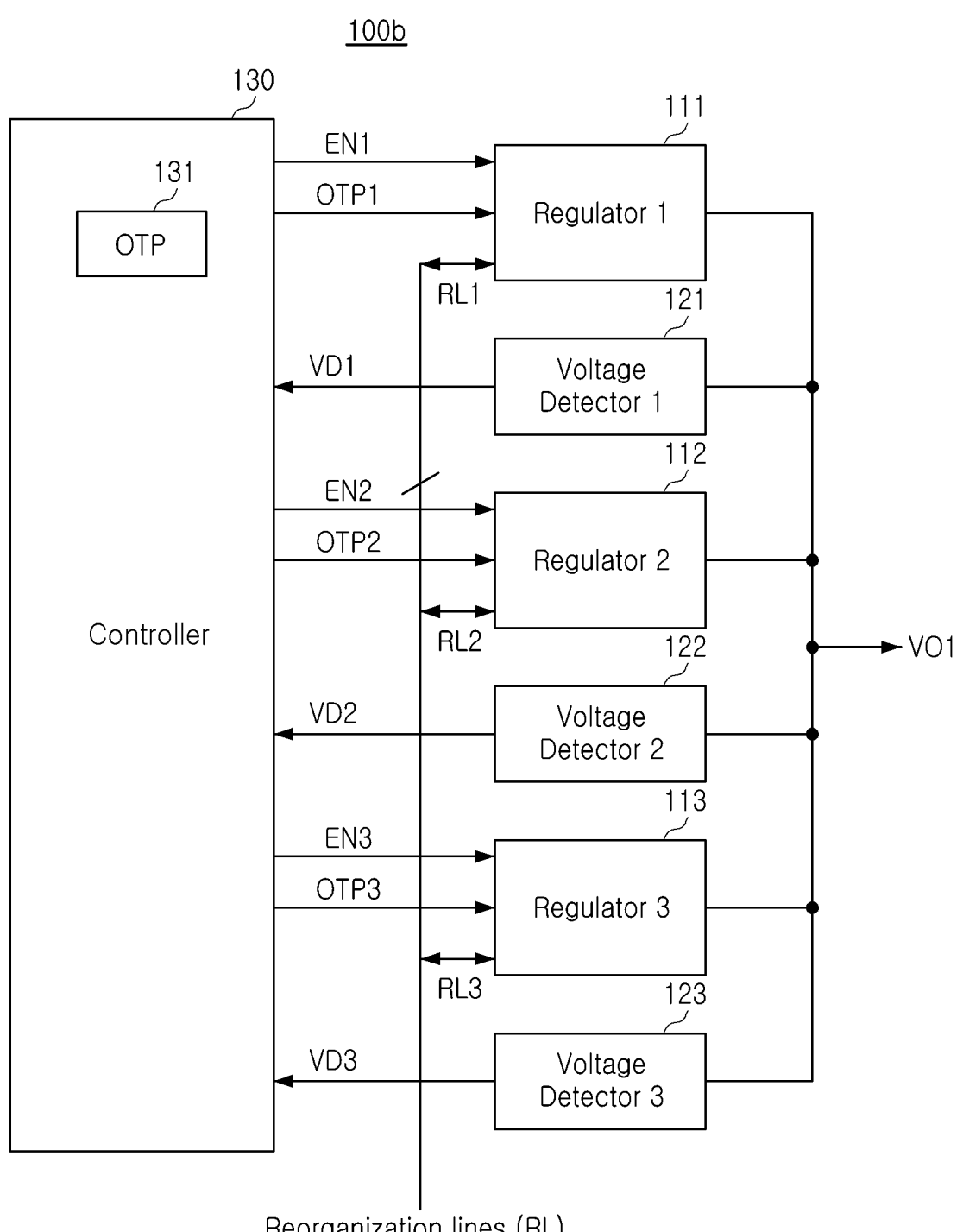
FIG. 7 is a diagram illustrating a PMIC 100b in which three regulators are connected in parallel according to an example embodiment of the disclosure.

FIG. 7 is a diagram illustrating a PMIC 100b in which three regulators are connected in parallel according to an example embodiment of the disclosure. Referring to FIG. 7, the PMIC 110b may include the first regulator 111, the second regulator 112, and the third regulator 113 connected in parallel. Here, the first regulator 111, the second regulator 112, and the third regulator 113 connected in parallel may output the first output voltage VO1.

Meanwhile, as described in FIGS. 6 and 7, even if the parallel combination of regulators is changed, there is no OTP change. That is, by using the OTP storing the same set value and monitoring information of the output voltage, it is possible to determine the set value for different products.

Figure 8:
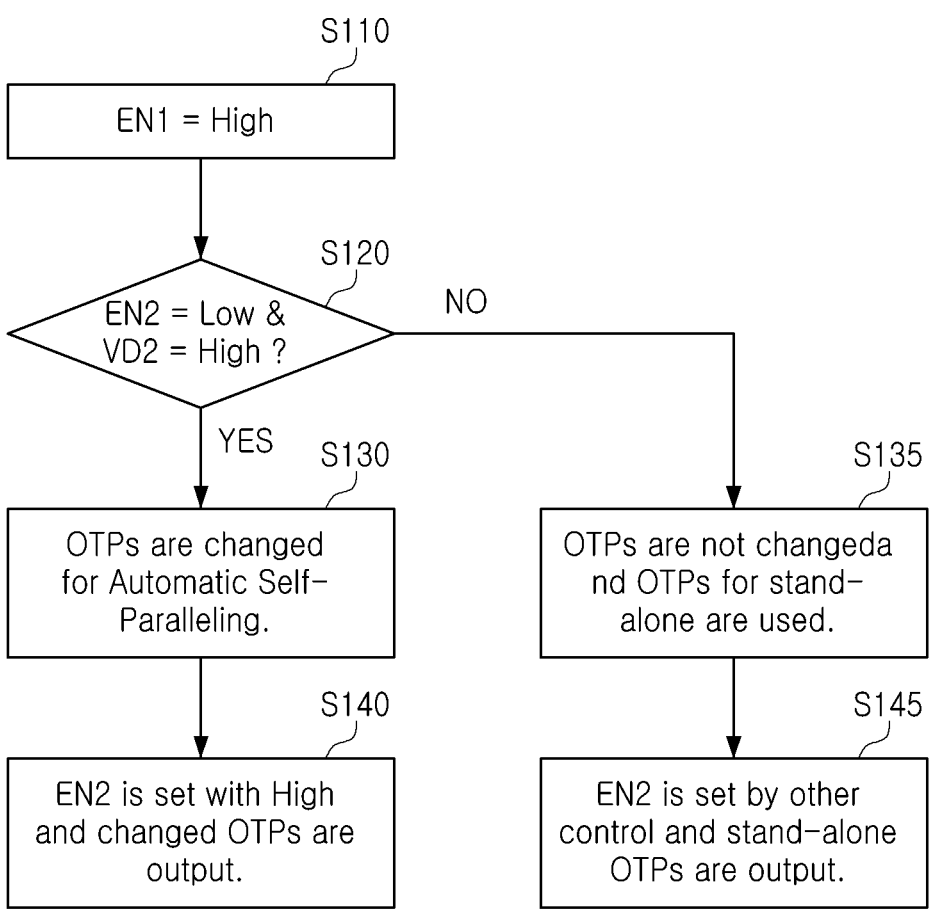
FIG. 8 is a flowchart illustrating an operating method of a PMIC according to an example embodiment of the disclosure.

FIG. 8 is a flowchart illustrating an operating method of the PMIC 100 according to an example embodiment of the disclosure. Referring to FIGS. 4 to 8, the operation of the PMIC 100 may be performed as follows.

According to an example embodiment, in operation S110, the first enable signal EN1 of the first regulator 111 may have a high level. In operation S120, it may be determined whether the second enable signal EN2 of the second regulator 112 has a low level and the second output voltage VD2 of the second regulator 11 has a high level.

If the first regulator 111 and the second regulator 112 are configured in parallel, as the first regulator 111 is enabled, the second output voltage VD2 of the second regulator 112 may also increase at the same time. Although the second enable signal EN2 has a low level, the second output voltage VD2 may have a high level. In this case, the OTP configuration of the second regulator 112 may be automatically changed to an OTP value indicating a parallel mode (S130). In operation S140, The controller 130 converts the second enable signal EN2 of the second regulator 112 to a high level with the changed OTP value, and configures reorganization lines (RL) necessary for parallel configuration. In general, the reorganization lines RI, corresponds to a wiring required for parallel configuration, such as current information of the first regulator 111 operating independently. In addition, the second set value OTP2 required for the parallel configuration may be used to control a discharge function, including a compensation value of a compensator of a subordinate regulator.

Meanwhile, when the first regulator 111 and the second regulator 112 are configured independently of each other, the second output voltage VD2 of the second regulator 112 is 0V. That is, the second output voltage VD2 has a low level. The OTP values are not changed, and the OTP values may indicate a stand-alone (independent) mode (S135). The second enable signal EN2 may be set by other control, and the stand-alone OTP values may be output to the regulators 111 and 112 (S145). Accordingly, the first and second regulators 111 and 112 may operate by receiving OTP values for independent configuration.

In an example embodiment, changing the set values may include storing default information from a non-volatile memory (e.g., OTP) in a first register; storing update information from the non-volatile memory in a second register; and selecting one of the value stored in the first register and the value stored in the second register as a set value of the corresponding regulator in response to a detection signal. In an example embodiment, in changing the set values, the set value of the second regulator may be changed to include a discharge function when the operating mode is a parallel mode. In an example embodiment, reorganization lines may be selected for a parallel mode operation with the changed set values.

Meanwhile, the PMIC according to an example embodiment of the disclosure may change an operating mode according to a supplying device.

Figure 9A:
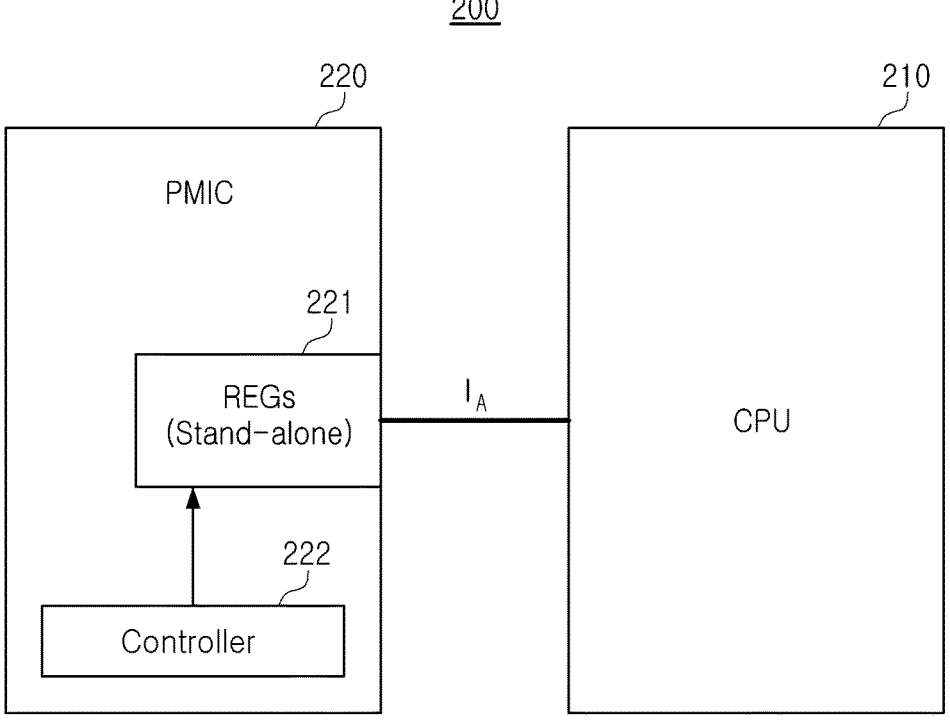
FIGS. 9A and 9B are diagrams illustrating an electronic device including a PMIC according to an example embodiment of the disclosure.
Figure 9B:
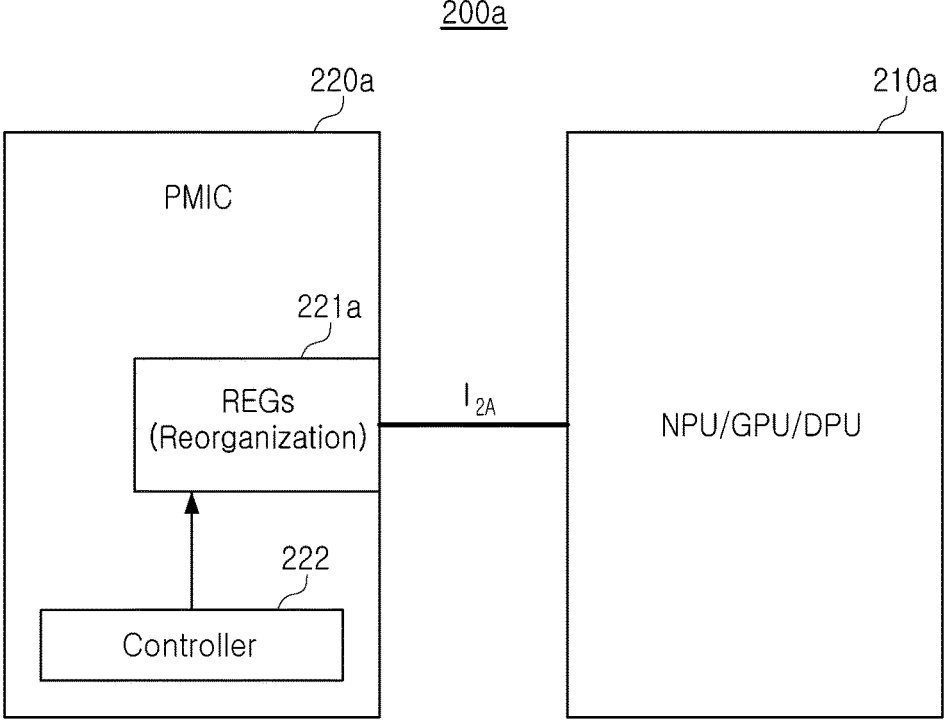

FIGS. 9A and 9B are diagrams illustrating an electronic device having a PMIC according to an example embodiment of the disclosure.

Referring to FIG. 9A, an electronic device 200 may include a CPU 210 and a PMIC 220. Each of a plurality of regulators REGs 221 may operate in a stand-alone mode under the control of a controller 222. In an example embodiment, when each regulator operates in the stand-alone mode, each regulator may provide a first current IA to a CPU 210.

Referring to FIG. 9B, an electronic device 200a may include at least one of an neural processing unit (NPU), graphics processing unit (GPU) or data processing unit (DPU) 210a and a PMIC 220a. A plurality of regulators REGs 221a may operate in a parallel mode under the control of the controller 222. Here, the controller 222 may determine whether to apply the parallel mode according to an output voltage of the regulator, as described above with reference to FIGS. 4 to 8. In an example embodiment, when operating in the parallel mode, each regulator may provide the second current $I_{2A}$ to the NPU/GPU/DPU 210a. Here, the second current $I_{2A}$ may be greater than the first current IA.

Meanwhile, although the PMICs 220 and 220a illustrated in FIGS. 9A and 9B have the same product number, they may be implemented in different operating modes.

Figure 10:
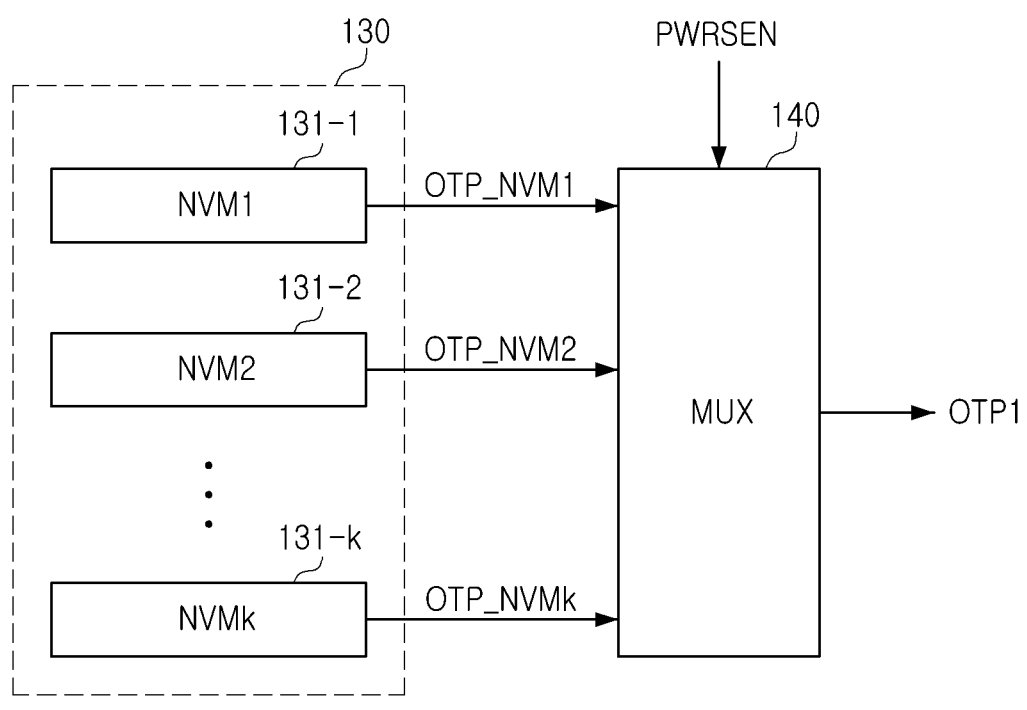
FIG. 10 is a diagram schematically illustrating a process of selecting an one-time programming (OTP) value of a regulator in a PMIC according to an example embodiment of the disclosure.

FIG. 10 is a diagram schematically illustrating a process of selecting an OTP value of a regulator in the PMIC 100 according to an example embodiment of the disclosure. Referring to FIG. 10, a multiplexer (MUX) 140 may output, as a set value OTP1, one of set values OTP_NVM1, OTP_NVM2, . . . , OTP_NVMk output from the OTP 130 including a plurality of non-volatile memories NVM1 131-1, NVM2 131-2, . . . , NVMk 131-$k$ ($k$ is an integer of 2 or greater) in response to a power detection signal PWRSEN. Here, the power detection signal PWRSEN may correspond to monitoring information of a corresponding regulator.

Figure 11:
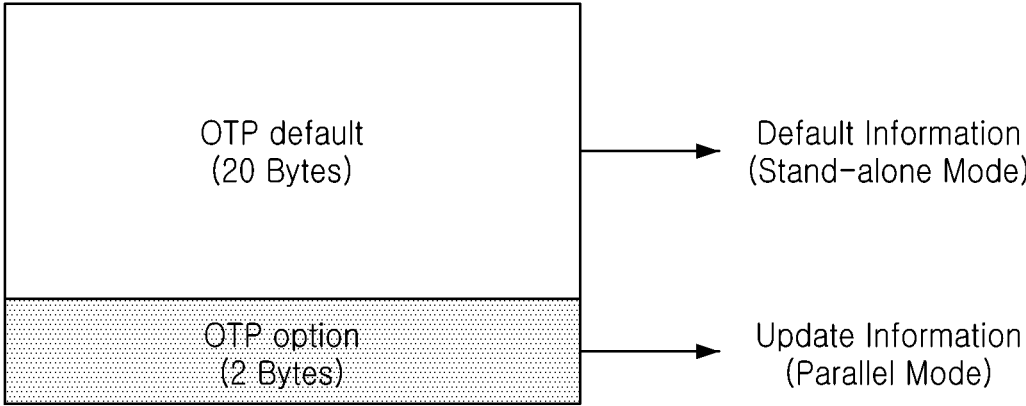
FIG. 11 is a diagram illustrating an OTP value for setting a regulator according to an example embodiment of the disclosure.

FIG. 11 is a diagram illustrating an OTP value for setting a regulator according to an example embodiment of the disclosure. Referring to FIG. 11, the OTP value stored in the regulator may include default information and update information (or additional information). In an example embodiment, the default information may include an OTP default value. In an example embodiment, the default information may include 20 bytes. The default information may include information related to output voltage, current limit, detection threshold, DVS ramp, switching phase, and output inductor. In an example embodiment, the default information may include information indicating a stand-alone mode. In an example embodiment, the update information may include information indicating a parallel mode. In an example embodiment, the update information may include 2 bytes.

Figure 12:
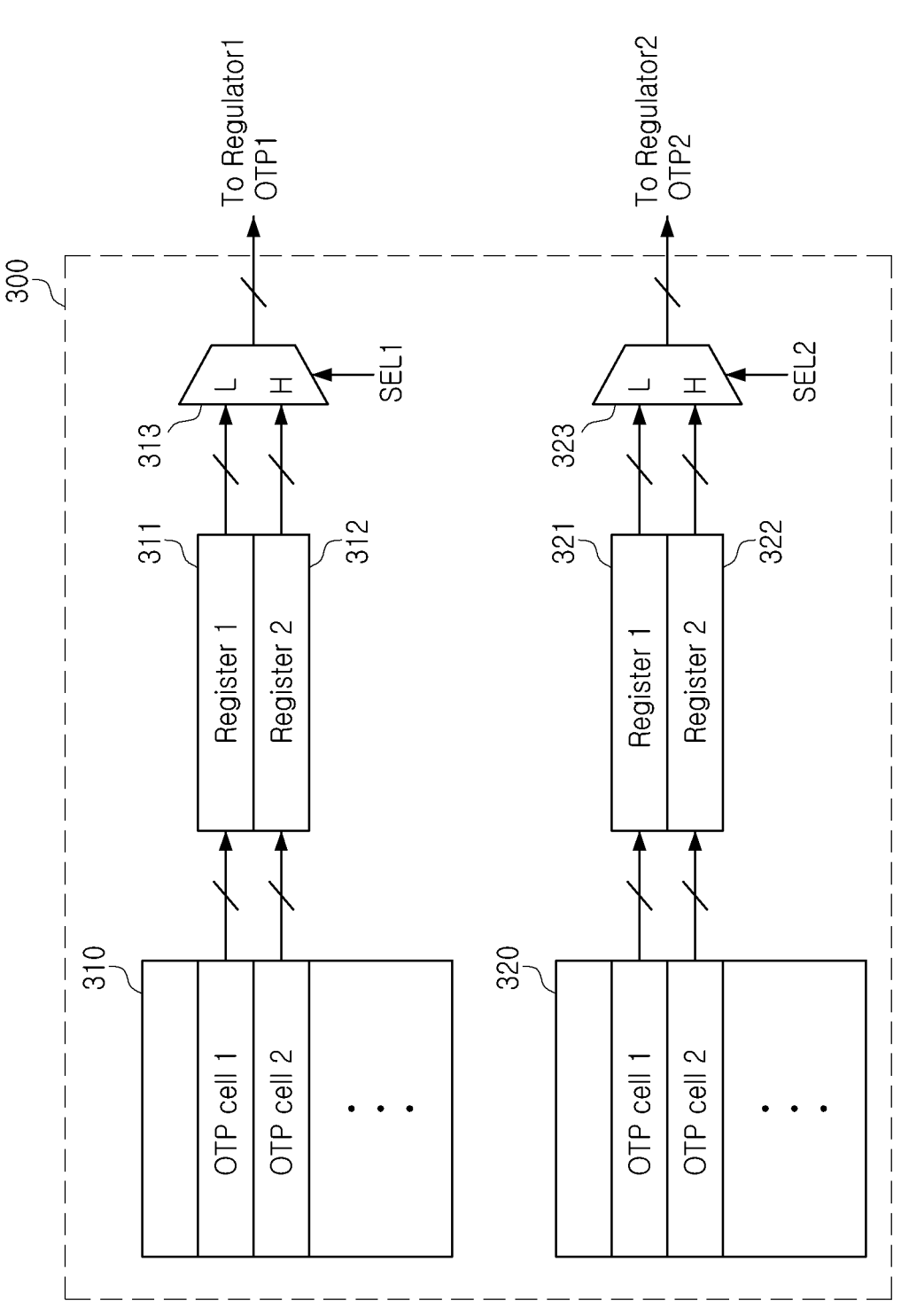
FIG. 12 is a diagram illustrating the OTP selection logic according to an example embodiment of the disclosure.

FIG. 12 is a diagram illustrating the OTP selection logic 300 according to an example embodiment of the disclosure. Referring to FIG. 12, the OTP selection logic 300 may include OTPs 310 and 320. Before a PMIC or a regulator is operated, OTP values for the first and second regulators may be written to registers 311, 312, 321, and 322. An OTP value for a stand-alone mode operation may be a value stored in a first OTP cell. An OTP value for a parallel mode operation may be a value stored in a second OTP cell. Accordingly, when the first and second regulators operate in the stand-alone mode, the values stored in the first OTP cell may be written to the first registers 311 and 321, respectively. The multiplexers 313 and 323 may output selected OTP values to corresponding regulators in response to selection signals SEL1 and SEL2, respectively. With these OTP values, each of the regulators may set an internal configuration in a form enabling the stand-alone mode operation.

Meanwhile, when outputs of the first regulator and the second regulator are connected outside the chip, an output voltage of the second regulator may increase by the first regulator. Accordingly, the output signal SEL2 of the voltage detector corresponding to the second regulator may have a high level. At this time, the value stored in the second OTP cell inside the OTP may be written to the second register 322. The multiplexer 323 may output the written value of the second register 322 as a second OTP value to the second regulator in response to the second selection signal SEL2. Using the transferred value OTP2, the second regulator may be changed to a structure for a parallel operation.

In an example embodiment, a time point at which the OTP value is written to the corresponding register may be a time point at which the PMIC applies a power-ON signal or an enable signal is applied from the outside.

According to an example embodiment, when the output voltage of the regulators are the same, the PMIC may bundle the outputs from the plurality of regulators to use to increase a maximum current. In this case, based on a first enabled regulator, the remaining regulators may be automatically configured in parallel to be enabled.

The PMIC according to an example embodiment of the disclosure automatically enables a parallel configuration without additional OTP change or any external communication.

Figures 13, 14:
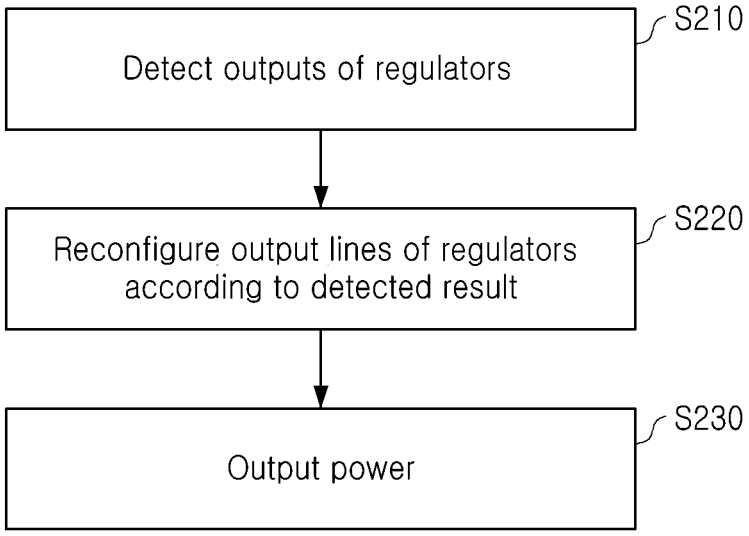
FIG. 13 is a diagram illustrating a product number using a PMIC according to an example embodiment of the disclosure.
FIG. 14 is a flowchart illustrating an operating method of a PMIC according to an example embodiment of the disclosure.

FIG. 13 is a diagram illustrating a product number using a PMIC according to an example embodiment of the disclosure. For a typical PMIC having three regulators, six product codes are generated. Meanwhile, the PMIC of the disclosure may correspond to two product codes.

FIG. 14 is a flowchart illustrating an operating method of a PMIC according to an example embodiment of the disclosure. Referring to FIG. 14, the operation of the PMIC may be performed as follows. In operation (S210), output voltages of the plurality of regulators (e.g., LDOs) may be detected. In operation (S220), output lines of a plurality of LDOs may be reconfigured according to a detection result. In operation (S230), power may be output from the plurality of LDOs through the reorganized output lines.

Figure 15:
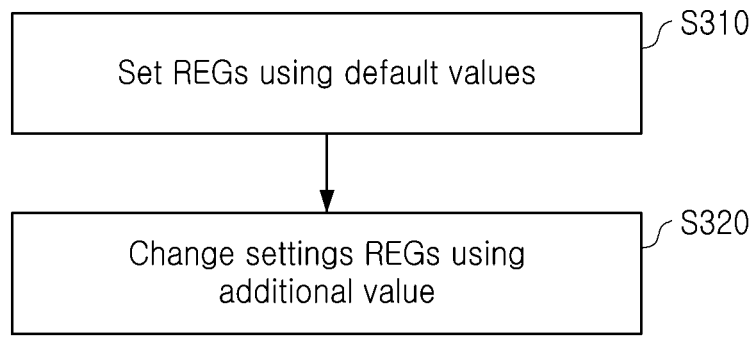
FIG. 15 is a flowchart illustrating a method of operating a regulator according to an example embodiment of the disclosure.

FIG. 15 is a flowchart illustrating a method of operating a regulator according to an example embodiment of the disclosure. Referring to FIG. 15, the operation of the regulator may be performed as follows. In operation S310, a plurality of regulators (REGS) may be set using default values. Thereafter, in operation S320, the settings of the plurality of regulators may be changed using an additional value.

Figure 16:
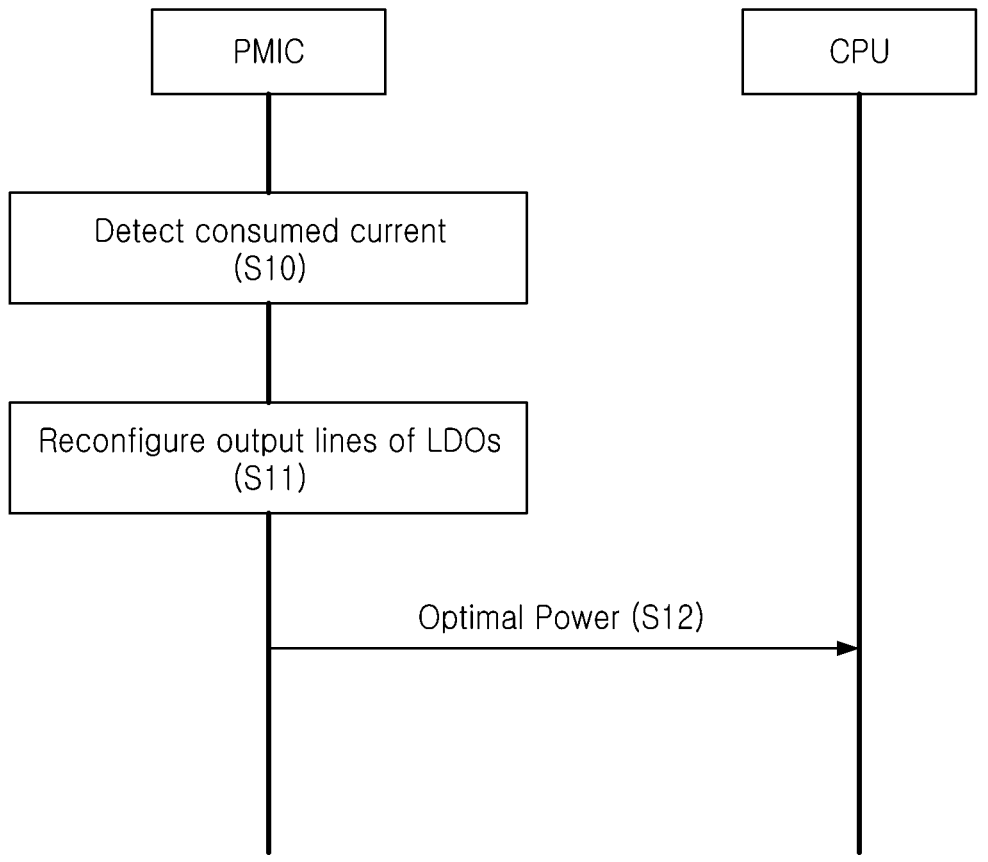
FIG. 16 is a ladder diagram illustrating a process of supplying optimal power in an electronic device according to an example embodiment of the disclosure.

FIG. 16 is a ladder diagram illustrating a process of supplying optimal power to an electronic device according to an example embodiment of the disclosure. Referring to FIG. 16, the PMIC may provide optimal power to a CPU in the following manner. The PMIC may detect current consumed by the CPU (S10). For example, the PMIC may determine the amount of current consumed (e.g., power consumption amount) by the CPU. The PMIC may reconfigure the output lines of the regulators according to the consumed current (S11). For example, the PMIC may reconfigure the output lines of the regulators according to the amount of current consumed by the CPU. The PMIC may provide optimal power to the CPU by the reconfigured regulators (S12).

Figure 17:
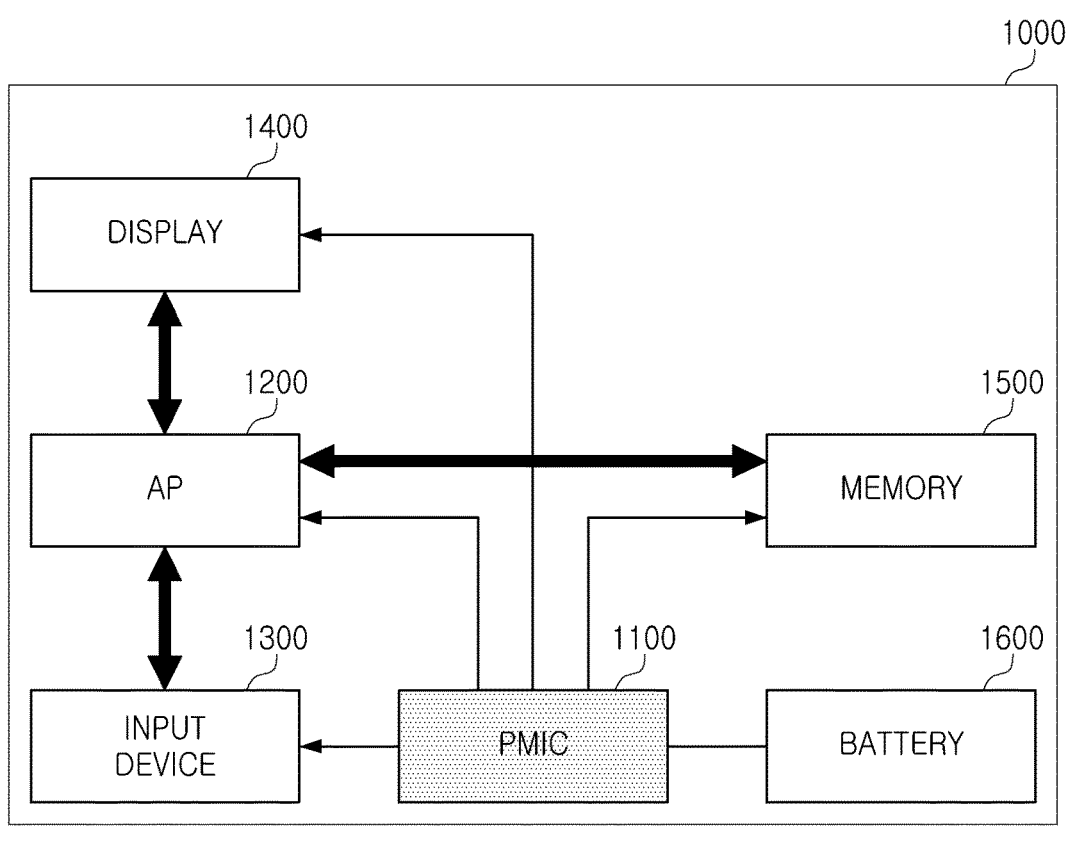
FIG. 17 is a diagram illustrating an electronic device according to an example embodiment of the disclosure.

FIG. 17 is a diagram illustrating an electronic device 1000 according to an example embodiment of the disclosure. Referring to FIG. 17, the electronic device 1000 may include a PMIC 1100, an application processor (AP) 1200, an input device 1300, a display 1400, a memory 1500, and a battery 1600. For example, the electronic device 1000 may be a device included in a vehicle, or the electronic device 1000 may be a smartphone, a personal computer (PC), a tablet PC, a netbook, an e-reader, a personal digital assistant (PDA), a portable multimedia player (PMP), an MP3 player, an ultra-mobile PC (UMPC), a workstation, a portable computer, a web tablet, a tablet computer, a wireless phone, a mobile phone, a smartphone, an e-book, a portable game machine, a navigation device, a black box, a digital camera, a digital multimedia broadcasting (DMB) player, a 3-dimensional television, smart television, digital audio recorder, a digital audio player, a digital picture recorder, a digital picture player, a digital video recorder, a digital video player, a storage constituting a data center, a device capable of transmitting and receiving information in a wireless environment, one of various electronic devices constituting a home network, one of various electronic devices constituting a computer network, one of various electronic devices constituting a telematics network, a radio frequency identification (RFID) device, or various components constituting a computing system. Also, the electronic device 1000 may be a wearable device, such as an electronic bracelet or an electronic necklace.

According to an example embodiment, the PMIC 1100 may receive power from the battery 1600 and may supply and manage power of the AP 1200, the input device 1300, the display 1400, or the memory 1500. The electronic device 1000 may include at least one PMIC 1100. However, the disclosure is not limited, and as such, according to another example embodiment, a plurality of PMICs may be provided to manage power distribution to the various electronic components in the electronic device 1000. In an example embodiment, the electronic device 1000 may supply power to the AP 1200, the input device 1300, the display 1400, or the memory 1500 using one PMIC 1100. In another embodiment, the electronic device 1000 may include a plurality of PMICs 1100 for individually supplying power to each of the AP 1200, the input device 1300, the display 1400, or the memory 1500. Meanwhile, as described with reference to FIGS. 4 to 16, the PMIC 1100 may be configured to monitor a voltage of at least one regulator and reorganize each of the regulators to operate in a parallel mode according to a monitoring result.

The AP 1200 may control the overall operation of the electronic device 1000. For example, the AP 1200 may display data stored in the memory 1500 through the display 1400 according to an input signal generated by the input device 1300. The input device 1300 may be implemented as a touch pad, a pointing device, such as a computer mouse, a keypad, or a keyboard.

The memory 1500 may be configured to store various data used by at least one component of the electronic device 1000, for example, input data or output data for software and related commands. The memory 1500 may include a volatile memory or a non-volatile memory. In an example embodiment, the memory 1500 may store information on task execution conditions corresponding to various tasks. For example, the electronic device 1000 may store a task execution condition corresponding to respective user identification information. The memory 1500 may store load control information for various operations of the electronic device 1000.

The battery 1600 may be implemented as a rechargeable battery. For example, the battery 1600 may be charged using power received through an interface circuit or power received through a wireless charging module.

The interface circuit may be connected to an external power source by wire to transmit power from the external power source to the PMIC 1100. The interface circuit may be implemented as a connector connecting a cable for providing power or as a connector for connecting a cable for providing power and a cable to an external power source. For example, the interface circuit may be implemented as various universal serial bus (USB) type connectors. However, it should be understood that there is no limit to the type of connector. When receiving DC power from an external power source, the interface circuit may transmit the received DC power to the PMIC 1100 or may convert a magnitude of a voltage to transmit the power. Meanwhile, when receiving AC power from an external power source, the interface circuit may convert the received AC power into DC power or may convert a magnitude of a voltage to transmit power.

The wireless charging module may be implemented in a method defined in the Wireless Power Consortium (WPC) standard (or Qi standard) or in a method defined in the Alliance for Wireless Power (A4WP) standard (or air fuel alliance (AFA) standard). The wireless charging module may include a coil in which an induced electromotive force is generated by a magnetic field whose magnitude changes according to time formed therearound. The wireless charging module may include at least one of a receiving coil, at least one capacitor, an impedance matching circuit, a rectifier, a DC-DC converter, or a communication circuit. The communication circuit may be implemented as an in-band communication circuit of an ON/OFF keying modulation/demodulation method, or may be implemented as an out-of-band communication circuit (e.g., a BLE communication module). According to various embodiments, the wireless charging module may receive a beam-formed radio frequency (RF) wave based on the RF method.

In an example embodiment, the interface circuit or the wireless charging module may be connected to a charger. The battery 1600 may be charged using power adjusted by the charger. The charger or converter may be implemented as an element independent from the PMIC 1100, or may be implemented as at least part of the PMIC 1100. The battery 1600 may transmit stored power to the PMIC 1100. Power through the interface circuit or power through the wireless charging module may be transmitted to the battery 1600 or may be transmitted to the PMIC 1100.

Figure 18:
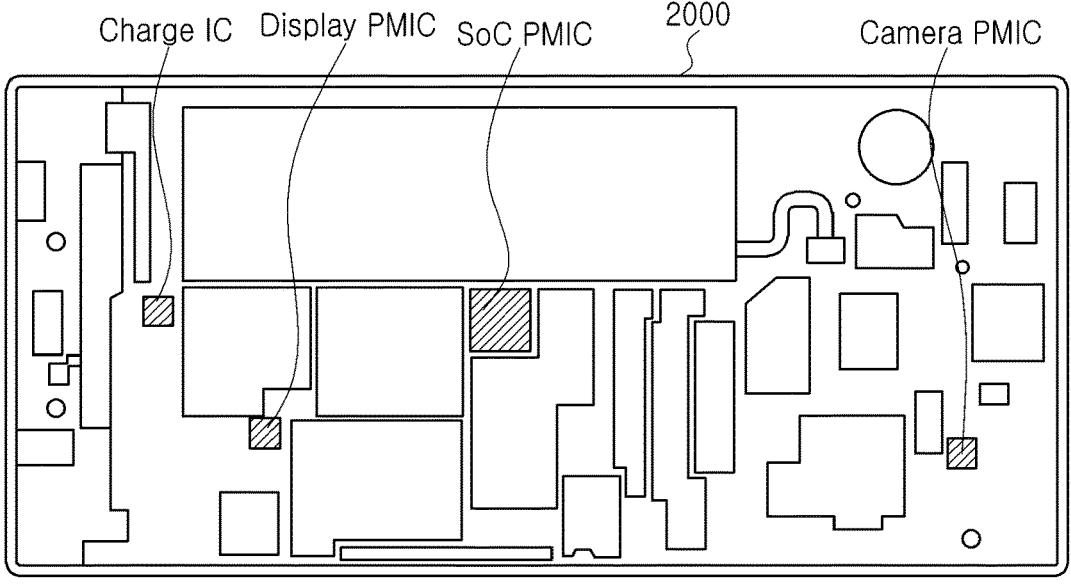
FIG. 18 is a diagram illustrating a mobile device to which a PMIC according to an example embodiment of the disclosure is applied.

FIG. 18 is a diagram illustrating a mobile device 2000 including a PMIC according to an example embodiment of the disclosure. Referring to FIG. 18, the mobile device 2000 may include a charge integrated circuit (IC), a display PMIC, a SoC PMIC, and a camera PMIC. At least one of the charge IC, the display PMIC, the SoC PMIC, and the camera PMIC may also be implemented in a structure in which the stand-alone mode and the parallel mode may be selected according to a monitoring result of an output voltage, as described above with reference to FIGS. 4 to 16.

According to another example embodiment, the PMIC according to the embodiment of the disclosure may be implemented in a vehicle.

Figure 19:
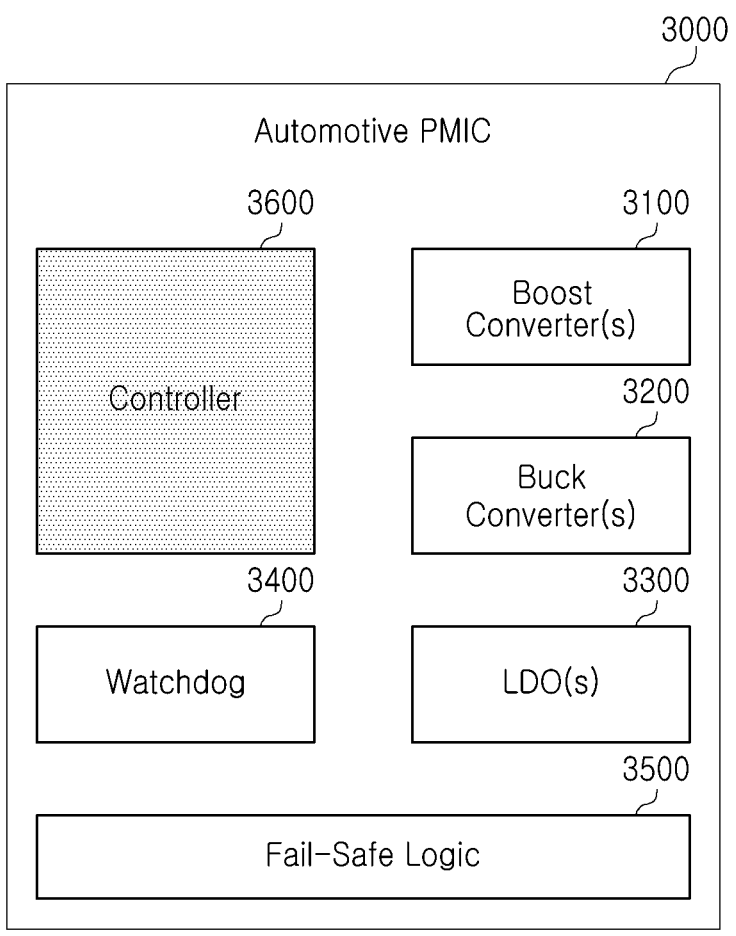
FIG. 19 is a block diagram illustrating a vehicle PMIC according to an example embodiment of the disclosure.

FIG. 19 is a block diagram illustrating a vehicle PMIC 3000 according to an example embodiment of the disclosure. Referring to FIG. 19, the vehicle PMIC 3000 may include at least one boost converter 3100, at least one buck converter 3200, at least one LDO 3300, a watchdog 3400, a fail-safe logic 3500, and a controller 3600. The controller 3600 may be configured to monitor output voltages of the at least one booster 3100, the at least one buck converter 3200, and the at least one LDO 3300, and change an operating mode according to a monitoring result.

The watchdog 3400 may be configured to monitor a monitoring target circuit and generate a watchdog signal corresponding to a monitoring result. Here, the monitoring target circuit may be at least one of the fail-safe logic 3500, the boost converter 3100, the buck converter 3200, and the LDO 3300.

The fail-safe logic 3500 may be configured to detect the occurrence of an error inside or outside the vehicle PMIC 3000 and enter a fail-safe mode when critically threatening to safety is determined according to an error detection result. For example, the fail-safe logic 3500 may turn off at least one boost converter 3100, at least one buck converter 3200, and at least one LDO 3300 in response to a watchdog signal.

The controller 3600 may be configured to determine a degree of risk of an error occurring in the vehicle PMIC 3000 based on at least one notification signal. For example, the controller 3600 may generate control signals according to a risk of an error that occurs and the Automotive Safety Integrity Level (ASIL) of an operating circuit. Here, the operating circuit may provide a service related to autonomous driving to a user or a driver. The ASIL refers to a vehicle safety integrity level, and a value thereof is determined based on HARA (Hazard Analysis and Risk Assessment). HARA is a factor for evaluating a risk to a driver when the operating circuit malfunctions.

The controller 3600 may also be configured to automatically select an OTP value and update a corresponding regulator, as described above with reference to FIGS. 1 to 18.

According to an example embodiment of the disclosure, the PMIC may automatically supply a required current capacity by connecting an output of a power regulator without changing a product.

According to an example embodiment of the disclosure, the PMIC may increase a current capacity by configuring the power converters in parallel without changing the product. As a result, the disclosure secures flexibility in power usage and eliminates the need for additional product development and management. Therefore, the disclosure may shorten a product development schedule.

According to an example embodiment of the disclosure, the electronic device having the PMIC may increase a current capacity by configuring regulators in parallel without changing a product. According to an example embodiment of the disclosure, an operating method of the PMIC is provided, in which, a current capacity may be increased by configuring regulators in parallel without changing a product.

According to an example embodiment of the disclosure, the electronic device having the PMIC automatically enable a parallel structure of power wiring, thereby significantly shortening a product development period. According to an example embodiment of the disclosure, an operating method of the PMIC is provided, in which, a parallel structure of power wiring may be automatically enabled, thereby significantly shortening a product development period.

While example embodiments have been illustrated and described above, it will be apparent to those skilled in the art that modifications and variations could be made without departing from the scope of the disclosure as defined by the appended claims.

What is claimed is:

1. A power management integrated circuit for updating an operation mode based on a determination of a connection configuration of a plurality of regulators, comprising:
   a first regulator, among the plurality of regulators, configured to operate based on a first set value and output a first output voltage;

a second regulator, among the plurality of regulators, configured to operate based on a second set value and output a second output voltage;
   a third regulator, among the plurality of regulators, configured to operate based on a third set value and output a third output voltage;
   a first voltage detector configured to monitor the first output voltage and output a first detection signal;
   a second voltage detector configured to monitor the second output voltage and output a second detection signal;
   a third voltage detector configured to monitor the third output voltage and output a third detection signal; and
   a controller configured to determine the first set value, the second set value, and the third set value based on the first detection signal, the second detection signal, or the third detection signal,
   wherein the first set value, the second set value, and the third set value, indicate the operation mode for each of the first regulator, the second regulator and the third regulator,
   wherein the first regulator is further configured to:
      receive a first enable signal and the first set value, and output the first output voltage,
   wherein the second regulator is further configured to:
      receive a second enable signal and the second set value, and
      output the second output voltage upon which, the controller determines the connection configuration of the plurality of regulators as being parallel and updates the second set value of the second regulator to be indicative of a parallel mode.

2. The power management integrated circuit of claim 1, wherein each of the first regulator, the second regulator and the third regulator operates in one of a stand-alone mode or the parallel mode.

3. The power management integrated circuit of claim 1, further comprising a non-volatile memory configured to store the first set value, the second set value, and the third set value.

4. The power management integrated circuit of claim 3, wherein the non-volatile memory is a one-time programming (OTP) memory.

5. The power management integrated circuit of claim 1, wherein each of the first set value, the second set value, and the third set value includes one of default information and update information, and wherein the default information comprises information indicating a stand-alone mode, and the update information comprises information indicating the parallel mode.

6. The power management integrated circuit of claim 5, wherein the update information is selected based on the first detection signal, the second detection signal, or the third detection signal.

7. The power management integrated circuit of claim 5, wherein the controller comprises a plurality of selection logics, and
   wherein each of the plurality of selection logics comprises:
      a plurality of first one-time programming (OTP) cells configured to store the default information;
      a plurality of second OTP cells configured to store the update information;
      a first register configured to store the default information from the first OTP cells;
      a second register configured to store the update information from the second OTP cells; and a multiplexer configured to select a first value stored in the first register or a second value stored in the second register as the first set value, the second set value or the third set value based on a corresponding selection signal, and wherein the corresponding selection signal is determined according to a corresponding one of the first output voltage of the first regulator, the second output voltage of the second regulator, or the third output voltage of the third regulator.

8. The power management integrated circuit of claim 1, wherein the first regulator operates based on a first enable signal, wherein the second regulator operates based on a second enable signal, and wherein the third regulator operates based on a third enable signal.

9. The power management integrated circuit of claim 8, wherein, when each of the first regulator, the second regulator and the third regulator operates in a stand-alone mode, the first enable signal, the second enable signal, and the third enable signal are independent of each other.

10. The power management integrated circuit of claim 8, wherein, when at least two of the first regulator, the second regulator and the third regulator operates in a parallel mode, at least one of the first enable signal, the second enable signal, and the third enable signal has a high level at a point in time different from another of the first enable signal, the second enable signal, and the third enable signal.

11. An operating method of a power management integrated circuit for updating an operation mode based on a determination of a connection configuration of a plurality of regulators, the operating method comprising:

outputting a first enable signal to a first regulator, among the plurality of regulators, at a high level;

detecting a detection signal of a second regulator, among the plurality of regulators, having a high level based on an output voltage from the second regulator and a second enable signal of the second regulator having a low level;

based on the detecting, determining that the connection configuration of the plurality of regulators are being parallel;

changing set values of the first regulator and the second regulator to be indicative of a parallel mode according to the connection configuration;

setting the first regulator and the second regulator to the changed set values; and outputting the second enable signal at a high level.

12. The operating method of claim 11, wherein the changing the set values comprises:

storing default information from a non-volatile memory in a first register;

storing update information from the non-volatile memory in a second register; and selecting one of a first value stored in the first register and a second value stored in the second register, as a first set value of the second regulator or a second set value of the second regulator based on the detection signal.

13. The operating method of claim 11, wherein the changing the set values comprises:

changing a set value of the second regulator to include a discharge function when an operating mode of the second regulator is the parallel mode.

14. The operating method of claim 11, further comprising:

maintaining the set values of the first regulator and the second regulator for a stand-alone mode when the detection signal has a low level;

setting the first regulator and the second regulator to the set values; and outputting the second enable signal at a high level.

15. The operating method of claim 11, further comprising selecting reorganization lines for an operation in the parallel mode with the changed set values.

16. An electronic device comprising:

a processor; and a power management integrated circuit configured to supply power to the processor, wherein the power management integrated circuit comprises:

a plurality of regulators; and a controller configured to:

monitor output voltages of the plurality of regulators, and change a set value for each of the plurality of regulators, wherein the set value is indicative of an operating mode to be either a stand-alone mode or a parallel mode according to a connection configuration determined based on the output voltages of the plurality of regulators, wherein the controller is further configured to:

detect, at a first time, a first output voltage from a first regulator, among the plurality of regulators, having a high level and a first enable signal of the first regulator having a high level, and a second output voltage from a second regulator, among the plurality of regulators, having a high level and a second enable signal of the second regulator having a low level;

determine the connection configuration as being parallel based on the detecting; and change the set value of the first and second regulators to be indicative of the parallel mode.

17. The electronic device of claim 16, further comprising:

a non-volatile memory configured to store the set value, wherein the non-volatile memory is configured to adjust default information corresponding to the stand-alone mode and update information corresponding to the parallel mode for each of the plurality of regulators.

18. The electronic device of claim 17, wherein the power management integrated circuit comprises a selection logic configured to select one of the default information and the update information as a set value corresponding to each of the plurality of regulators based on the output voltages of the plurality of regulators.

19. The electronic device of claim 16, wherein, when the output voltages of the plurality of regulators are same, the power management integrated circuit is configured to bundle of the output voltages of the plurality of regulators in order to increase a current provided to the processor, and wherein based on a first regulator that is enabled first, among the plurality of regulators, others of the plurality of regulators are automatically configured in the parallel mode.

20. The electronic device of claim 16, wherein the power management integrated circuit has a same product number regardless of the stand-alone mode and the parallel mode.

* * * * *